United States Patent [19]

Franks et al.

[11] 4,145,532

[45] Mar. 20, 1979

[54] PROCESS FOR MAKING PRECIPITATED CELLULOSE

[75] Inventors: Neal E. Franks, Enka; Julianna K. Varga, Asheville, both of N.C.

[73] Assignee: Akzona Incorporated, Asheville, N.C.

[21] Appl. No.: 854,957

[22] Filed: Nov. 25, 1977

[51] Int. Cl.$^2$ .............................................. C08B 16/00
[52] U.S. Cl. ...................................... 536/56; 106/168; 106/176; 536/57
[58] Field of Search ..................... 536/57, 56; 106/168, 106/176

[56] References Cited

U.S. PATENT DOCUMENTS

| 2,179,181 | 11/1939 | Graenacher et al. ............ 106/163 R |
| 2,744,292 | 5/1956 | Schlosser et al. ..................... 106/168 |
| 3,447,939 | 6/1969 | Johnson ................................. 536/43 |
| 3,508,941 | 4/1970 | Johnson ............................... 106/162 |
| 3,758,457 | 9/1973 | Broeck et al. ......................... 536/57 |

*Primary Examiner*—Ronald W. Griffin
*Attorney, Agent, or Firm*—Francis W. Young; Jack H. Hall; Clelle W. Upchurch

[57] ABSTRACT

A process is provided for making precipitated cellulose by dissolving cellulose in a tertiary amine oxide solvent containing from about 1.4 to about 29% of water.

10 Claims, 2 Drawing Figures

PROCESS FOR MAKING PRECIPITATED CELLULOSE

This invention relates generally to precipitated cellulose and more particularly to an improved process for preparing solutions of cellulose in a tertiary amine oxide and for making shaped cellulosic articles such as fibers and filaments therefrom.

A process for dissolving cellulose in a tertiary amine oxide is disclosed by Graenacher et al. in U.S. Pat. No. 2,179,181. In accordance with the disclosure, oxides of trimethylamine, triethylamine, tripropylamine, monomethyldiethylamine, dimethyl-monoethylamine, monomethyldipropylamine, N-dimethyl, N-diethyl or N-dipropylcyclohexylamine, N-dimethyl-methylcyclohexylamine and pyridine may be used. Graenacher reports relatively low solid solutions containing from 7 to 10% by weight of cellulose dissolved in 93 to 90% by weight of the tertiary amine. Graenacher does not disclose any such solutions having a high solids content, i.e., in the range of 10–35%. Graenacher makes no mention of the necessity and criticality for the inclusion of water in the solution.

Another process for dissolving cellulose or other compounds having strong intermolecular hydrogen bonding in a tertiary amine oxide is disclosed by Johnson in U.S. Pat. No. 3,447,939. A cyclic mono (N-methylamine-N-oxide) compound such as N-methylmorpholine-N-oxide is used as the solvent. The solution can be used in chemical reactions involving the dissolved compound or to precipitate the cellulose to form a film or filament. In accordance with the process, the solution is maintained as a liquid until it is used. The resulting solutions, insofar as the actual examples of the patent indicate, have much the same disadvantages of those prepared by the process disclosed in U.S. Pat. No. 2,179,181, because they are also of low solids content and have a high viscosity.

In accordance with the process disclosed in U.S. Pat. No. 3,508,941, two or more different polymers are dissolved in a cyclic mono (N-methylamine-N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiencies noted for the first mentioned Johnson patent.

It is a general object of this invention to provide an improved process for making a precipitated cellulose product. Another object of the invention is to provide a process for making a solution of cellulose in a tertiary amine oxide which contains higher concentrations of cellulose in a tertiary amine oxide than those solutions which have been available heretofore. Another object of the invention is to provide a solution of cellulose in amine oxide of relatively high solids content which is adapted for shaping into a cellulosic article such as by extrusion or spinning. A more specific object of the invention is to provide a solution of cellulose in a tertiary amine oxide which has a higher solids content than the tertiary amine oxide solutions of the above-discussed prior art and a viscosity which adapts it for shaping such as by extrusion or spinning.

The foregoing objects and others are accomplished in accordance with this invention, generally speaking, by providing a process wherein cellulose is mixed with a solvent therefor containing a tertiary amine oxide and water in a very specifically defined critical range to provide a solution of increased solids content which is adapted to be extruded or spun and coagulated in water which removes the solvent to form films and filaments of precipitated cellulose. Stated in another way, the invention provides a method for dissolving cellulose in a solvent comprising a tertiary amine oxide and an amount of water which make possible the preparation of a solution having a substantially uniform composition. It is believed that the water causes swelling of the fibers as a first step to create the conditions necessary for solution of cellulose to occur.

The range of the amount of water to be included in the solvent in specific to each tertiary amine oxide and varies accordingly within the range of from about 1.4% to about 29% by weight based on the weight of the solution.

In accordance with this invention, the amount of cellulose dissolved in the solution may be varied from about 5% to about 35% by weight of solution, preferably from about 10% to about 25% by weight.

While the above mentioned researchers have attempted to define the class of amine oxides that can be used as a solvent for cellulose, none of the definitions are satisfactory, based on Applicants' results. Applicants postulate, without being bound by their theory, that the amine oxides of the invention, with one exception to be noted later, contain some type of cyclic structure where the amine function can be either exo to the ring or endo, i.e., a part of the ring. In the former case, an N,N-dimethylamine function creates the structure necessary to provide solvency whereas in the latter case, a single methyl radical on the nitrogen atom is required for solvency. Furthermore, the molecule must have a high dipole moment of say at least about 4.5 Debyes. It has been observed that pyridine-N-oxide, having a dipole moment of 4.2 Debyes will not dissolve cellulose.

Figure 1:
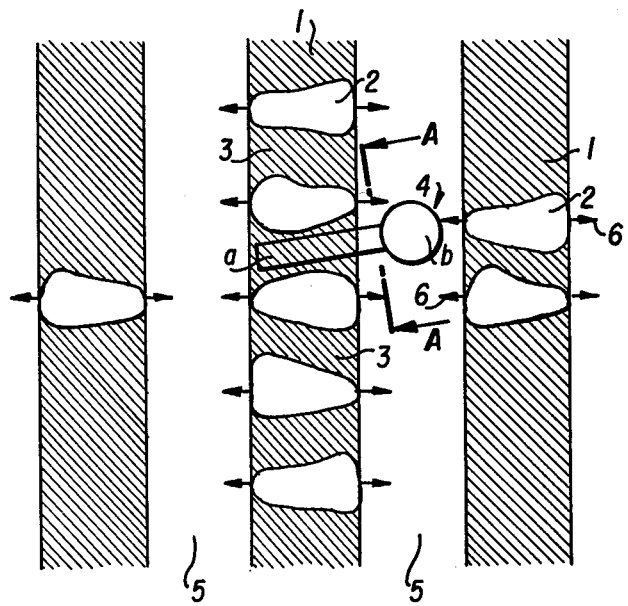
FIG. 1 is a schematic representation of the structure of cellulose, depicting applicants' theory of the solvent action of amine oxides of the invention.

Philipp and co-workers, B. Philipp, H. Schleicher, and W. Wagenknecht, Chemicke Vlakna, XXV, 10, (1975), have described the interaction between cellulose and amine oxides as an electron donor-acceptor complex which seems to be in line with the observed behavior of amine oxides in cellulose, a representation of which is shown in FIG. 1. Sheets of cellulose are represented in FIG. 1 by planes 1 perpendicular to the plane of the sheet of the drawing (shaded) separated by a space 5. The sheets are comprised of molecular chains 2 extending longitudinally in a direction perpendicular to the sheet of the drawing separated by a gap 3 between adjacent chains. A molecule of an amine oxide solvent for cellulose 4 as defined herein, is graphically represented and is comprised of a hydrophobic portion a and a polar end b. The arrows 6 represent the hydrogen bonding sites which give the polar region 5 its hydrophilic characteristics.

The dissolution of cellulose by certain amine oxides appears to require molecular structure having the polar end b provided by the N–O dipole and the hydrophobic end a able to slide into the space between the cellulose chains.

The interaction between the N—O dipole and the cellulose hydroxyl groups serves to disrupt the hydrogen bonded portion of the cellulose structure, much as the N—O dipole is known to interact with other alcohols or water.

Figure 2:
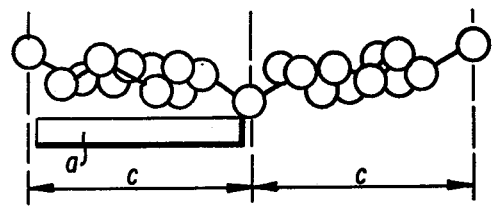
FIG. 2 is a schematic representation of a single anhydroglucose unit in a cellulose chain and a portion of the solvent molecule as viewed in the direction of the arrows A—A of FIG. 1.

With an exception to be noted later, the interaction between amine oxides and cellulose seems to require a cyclic structure to achieve solution. It is necessary to consider some postulated structures for the cellulose microfibril to rationalize this requirement. The simplest description that helps achieve this end is the structure put forward by J. O. Warwicker and A. C. Wright, J. Appl. Poly. Sci., 11, 659 (1967), a simplified version of which is shown in FIG. 2 in which the dimension c is the length of an anhydroglucose unit of the cellulose molecule, i.e., the distance between the hemiacetal oxygens in the cellulose chain. By referring to this structure, it is possible to distinguish the modes of action of the amine oxide between the relatively polar hydrogen bonded region 5 and the hydrophobic region 3 existing in the plane of the anhydroglucose residues (FIG. 1). The relative dimenions of the hydrophobic ring portion of the amine oxide molecule and the hydrophobic portion of the cellulose microstructure appear significant. It appears to be the case that the width of the ring structure, in order to "fit" within the space 3 between the adjacent chains of cellulose molecules, must be smaller than the length of the anhydroglucose unit c, that is, less than about 5.15 Å.

The following amine oxides have the necessary ring structure and dimensions and have been found to exhibit the solvency for cellulose contemplated by the invention:

N-methylhomopiperidine oxide
N-methylmorpholine oxide
N,N-dimethylcyclohexylamine oxide
N,N-dimethylbenzylamine oxide The foregoing amine oxides may be represented by one of the following formulae:

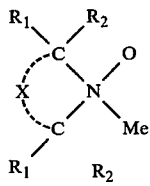

(a)

where
X is a radical chain completing a ring comprising 2 to 4 carbon atoms;
$R_1$ and $R_2$ are H or methyl (Me);

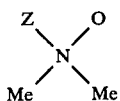

(b)

wherein Z is (i) a saturated or aromatic, unsaturated 5-, 6- or 7-membered ring which may be substituted only by methyl at the β- or ε-positions or (ii) $CH_2CH_2W$ where W can be OH, SH or $NH_2$.

However, substitution of a diethylamino group for the dimethylamino group results in an inoperative composition, due, in our opinion, to the masking of the dipole moment of the amine oxide end. Similarly, substitution of any groups, other than methyl at only the β- or ε-position of the ring, results in molecule in which the indicated dimension of the ring is greater than 5.15 Å and will not fit into the hydrophobic portion of the cellulose molecule.

Several solvents coming within the invention that do not meet the cyclic requirements for the hydrophobic end can be explained on the basis of a "pseudo-ring" structure. For instance, dimethylethanolamine oxide can be represented by a ring structure which may explain its ability to dissolve cellulose as follows:

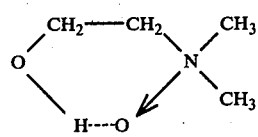

This molecule meets the spatial requirements postulated for the ring dimension to fit into the hydrophobic portion of the cellulose molecule. Moreover, it has been observed that dimethylamino-2-propanol N-oxide will not dissolve cellulose under the conditions of this invention and this observation would seem to lend support to the "pseudo-cyclic" structure proposed above in view of the larger dimension of the ring portion, i.e., greater than 5.15 Å, as follows:

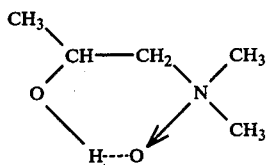

When these two compounds are viewed in the pseudo-cyclic representation, there is a close similarity to the N-methylmorpholine oxide series in which 2,6-dimethyl-N-methylmorpholine oxide is not an effective solvent for cellulose, although N-methylmorpholine oxide is.

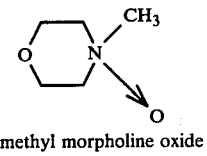
N-methyl morpholine oxide

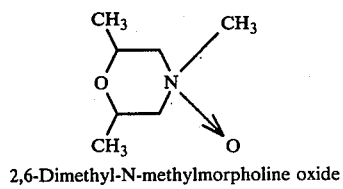
2,6-Dimethyl-N-methylmorpholine oxide

Another solvent, although marginal in its ability to dissolve cellulose, which can be explained by the pseudocyclic structure, is 2(2-hydroxypropoxy)-N-ethyl-N,N-dimethylamine N-oxide. The pseudocyclic structure proposed for this compound is:

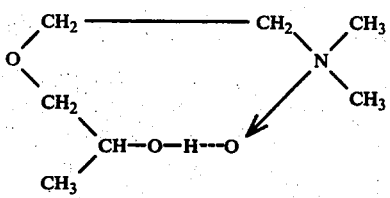

An exception to the cyclic structure proposed, mentioned previously, is triethylamine oxide.

However, this amine oxide is an effective solvent for cellulose (in the presence of the critical amount of water, from 7–29% by weight of cellulose), notwithstanding reported observations to the contrary. The reported observations of the inability of this amine oxide to act as a solvent is believed to be due to a rearrangement, or conversion, at the recovery temperatures used (90°–95° C.) and low water content, of at least part of the triethylamine oxide to diethylhydroxylamine oxide, which latter is not a cellulose solvent. However, applicant was able successfully to dissolve cellulose with triethylamine oxide, containing about 27–29% water by preparing the triethylamine oxide by adding 35% aqueous hydrogen peroxide to a mixture of triethylamine, methanol and an inorganic catalyst and removing the methanol and part of the water under vacuum and moderate temperature (60°–65° C.).

Tertiary amine oxides which may be used to advantage when mixed with water in practicing the invention include dimethylethanolamine oxide, dimethylbenzylamine oxide, triethylamine oxide, dimethylcyclohexylamine oxide, N-methylmorpholine oxide, N-methylhomopiperdine oxide and hydroxypropyldimethylethanolamine oxide.

As pointed out above, the percentage range of water required in the solvent will vary with the tertiary amine oxide in the solvent.

However, using as a solvent N-methylmorpholine N-oxide with about 5.5 to about 18% by weight water a solution containing 2–25% by weight cellulose based on total solution can be achieved; with N,N-dimethylethanolamine N-oxide as solvent containing from about 1.4% to about 13% by weight water the solution will contain from about 1 to 20% by weight cellulose; with N,N-dimethylbenzylamine N-oxide as solvent containing from about 5.5% to about 17% by weight water the solution will contain from about 1% to about 20% cellulose; with N,N-dimethylcyclohexylamine N-oxide as solvent containing from about 5.5% to about 16% by weight water the solution will contain from about 2 to about 27% by weight cellulose; with N-methylhomopiperidine N-oxide as solvent containing from about 5% (by extrapolation from N-methylmorpholine N-oxide) to about 20% by weight water the solution will contain from about 1% to about 22% by weight cellulose; with 2(2-hydroxypropoxy)-N-ethyl-N,N-dimethylamine N-oxide as solvent containing from about 5% to about 10% by weight water (by extrapolation from N,N-dimethylethanolamine N-oxide) the solution will contain from about 2% to about 7.5% by weight cellulose; with triethylamine N-oxide as solvent containing from about 7% to about 29% by weight water the solution will contain from about 5% to about 15% by weight cellulose, with N-methylpiperidine N-oxide as solvent containing from about 2.6 to about 17.5% by weight water the solution will contain from about 5% to about 17.5% cellulose. However, the lower limit will not be obtained by ordinary method of removing water from the triethyl amine oxide, since decomposition begins to take place below about 11% water.

An organic co-solvent may be used in quantities up to about 25% by weight of the total solution as a less expensive diluent for the amine oxide or to lower the viscosity of the solution, if desired. Any suitable aprotic organic liquid non-solvent for cellulose which will not react chemically with the amine oxide or cause degradation of the cellulose and have a high degree of polarity, i.e., a dipole moment greater than about 3.5 Debyes, will be suitable, such as, for example, dimethylsulfoxide, dimethylformamide, dimethylacetamide N-methylpyrrolidinone, hexamethylphosphorous triamide, acetonitrile, sulfolane, or the like. Dipole moments of suitable organic co-solvents described above that can be used with amine oxide solvents are shown in the following table:

| Compound | Dipole Moment |
|---|---|
| Dimethylformamide | 3.82 Debyes |
| Dimethylacetamide | 3.79 Debyes |
| Dimethylsulfoxide | 3.98–4.3 Debyes |
| N-methyl-2-pyrrolidinone | 4.09 Debyes |
| Sulfolane | 4.69 Debyes |
| Acetonitrile | 3.84 Debyes |

Any suitable cellulose may be used in the process such as, for example, cotton linters or various kinds of wood cellulose, but it is preferred to use a rayon grade wood pulp.

In the following Examples all parts and percentages are by weight unless otherwise stated.

EXAMPLE I

About 5.31 grams of rayon grade wood pulp (Buckeye V-68) containing about 6% water is mixed with about 46.3 grams of dimethylethanolamine oxide containing about 9.28% water and stirred for 16 minutes at 90° C. under a vacuum of 55 mm. of mercury.

After standing for about 14 minutes at 90° C. the cellulose has dissolved. The resulting solution containing 11.13% cellulose, 81.75% of amine oxide and 7.12% water, is extruded into water and washed with water until free of the tertiary amine oxide.

EXAMPLE II

About 30 grams wood pulp Viscocell ELV containing about 6% water is suspended in about 127.5 grams dimethylcyclohexylamine oxide containing about 11.6% by weight water at about 80°–90° C. for about 70 minutes under a nitrogen blanket. The resulting solution is extruded into water and washed with water until free of tertiary amine oxide. The precipitated cellulose thus obtained has an intrinsic viscosity in cuene of $[n]_{0.5} = 3.78$.

EXAMPLE III

About 9.5 grams rayon grade wood pulp (V-68) containing about 6% water is suspended in about 41.88 grams dimethylethanolamine oxide containing about 9.28% by weight water, and homogenized for 13 minutes at about 90° C. and stirred continuously for about 30 minutes at 90° C. under a vacuum of 53.2 mm. of mercury. The resulting solution, containing 20.46% cellulose, 78.08% tertiary amine oxide and 1.46% water, is spun into water to form a precipitated cellulose filament which is washed with water until free of tertiary amine oxide.

EXAMPLE IV

About 7.1 grams of Buckeye V-60 cellulose containing about 6% water is suspended in about 40 grams triethylamine oxide containing about 14.7% by weight water and about 5 ml of methanol for 5 minutes at about 65°–70° C. The resulting swollen mass is transferred to a high shear mixer and homogenized at 60° C. for about 60 minutes.

The temperature is increased to 73° C. under a vacuum of 25 inches mercury and held for about 30 minutes to completely dissolve the cellulose. The solution is spun into water and the resulting filaments are washed free of tertiary amine oxide and methanol with water. The precipitated cellulose has a cuene $[n]_{0.5}$ of 5.12.

EXAMPLE V

About 36 grams of Buckeye V-60 pulp containing about 6% water, about 188.3 grams triethylamine oxide containing about 26.17% by weight water and about 10 ml of methanol are mixed together by the procedure described in Example IV. The mixing time under vacuum is about 1.5 hours at 70° C. to dissolve the cellulose. The solution contains about 11.2% water. The resulting solution is spun into water and the filaments are washed free of tertiary amine oxide and methanol with water. The precipitated cellulose had a cuene $[n]_{0.5}$ of 3.26.

The high solids solution provided by the invention may be shaped by extrusion into a film or spun into filaments or yarns by conventional extrusion and spinning process for making precipitated cellulose articles.

EXAMPLES VI-1 through VI-57

The solubility in various tertiary amine oxides at different concentrations of non-solvent containing water is illustrated in Table I. In this table DMSO is an abbreviation for dimethylsulfoxide. "DMF" is an abbreviation for dimethylformamide, "A.O." refers to the tertiary amine oxides and "N.D." indicates that a value was "not determined."

Whether or not the cellulose dissolved in the tertiary amine oxide and water is indicated by "yes" or "no" in the column under "Solution." In some cases, the formation of solution could be determined visually without the necessity for obtaining X-ray confirmation. In other cases, it is necessary to make X-ray measurements to state whether solution has occurred, as will be next explained.

Certain tertiary amine oxides, under proper conditions, can cause disruption of the native cellulose I in order to form solutions of cellulose in the amine oxide. The nature of the interaction between the cellulose molecule and amine oxide has not been defined, but is thought to exist as a physicochemical complex. Upon addition of a protic substance to this solution, the complex is disrupted and a precipitated cellulose can be obtained. The cellulose I form is thought to be a metastable moiety; hence the precipitated cellulose obtained will occur as either the cellulose II form or as amorphous cellulose. This proposition is shown as Scheme I.

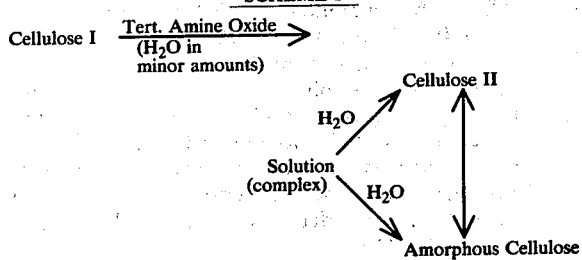

SCHEME I

Each of the three cellulose structures described here have distinct X-ray diffraction patterns characterized by reflection at certain values of 2 $\theta$. (Cf. O. Ellefsen and B. A. Tonnenson, in *High Polymers, Cellulose and Cellulose Derivatives*, ed. by N. M. Bikales and L. Segal, Vol. V., Part IV, p. 151, John Wiley, New York, 1971.) Native cellulose (wood pulp or cotton) occurs in the cellulose I configuration; regenerated or precipitated cellulose fibers will have either the cellulose II or amorphous configuration or a mixture thereof. Thus, it is possible to measure whether or not changes have occurred in the native cellulose when subjected to amine oxide treatment by examining the recovered cellulose samples and performing X-ray diffraction measurements on them. The form of the cellulose obtained with the solutions listed in Table I are indicated by the numeral I or II or Am. (for amorphous) and the crystal order for Cellulose I.

TABLE I

| | Ex. No. | % H$_2$O | % Cell. | Temp. °C. | X-ray Results Form (Crystal Order) | Solution |
|---|---|---|---|---|---|---|
| Dimethylcyclohexyl-amine Oxide | VI-1 | 16.7 | 5 | 90–95 | I + II | partial |
| | VI-2 | 16.7 | 10 | 90–95 | I + II | partial |
| | VI-3 | 14.75 | 5 | 90–95 | | Yes |
| | VI-4 | 14.75 | 10 | 90–95 | II | Yes |
| | VI-5 | 14.75 | 15 | 90–95 | Not determined (N.D.) | Yes |
| | VI-6 | 14.75 (25% DMSO) | 5 | 103 . 108 | | Yes |
| | VI-7 | 14.75 (25% DMSO) | 10 | 103–108 | N.D. | Yes |
| | VI-8 | 10.9 | 5 | 95–100 | N.D. | Yes |
| | VI-9 | 10.9 | 10 | 95–100 | N.D. | Yes |
| | VI-10 | 4.5 | 22.87 | 110–120 | Decomposed | No |
| Triethylamine Oxide | VI-11 | 27–29 | 5 | 100 | N.D. | Yes |
| | VI-12 | 27–29 (25% DMSO) | 5 | 100 | N.D. | Yes |
| N-methylpiperidine Oxide | VI-13 | 25 | 5 | 80–90 | I | No |
| | VI-14 | 17.5 | 5 | 115–120 | II | Yes |
| | VI-15 | 17.5 | 10 | 115–120 | II | Yes |
| | VI-16 | 14.05 | 5 | 95–100 | II + Am. | Yes |
| | VI-17 | 14.05 | 10 | 95–100 | II | Yes |
| N-methylpiperidine Oxide | VI-18 | 9 | 16 | 105–120 | II | Yes |
| | VI-19 | 2.6 (calc.) | 17.5 | 105–120 | II | Partial |

TABLE I-continued

| Ex. No. | % H$_2$O | % Cell. | Temp. °C. | X-ray Results Form (Crystal Order) | Solution |
|---|---|---|---|---|---|
| N-methylmorpholine Oxide | VI-20 | 19.9 | 5 | 90–95 | I (0.92) | No |
| | VI-21 | 19.9 | 10 | 90–95 | I (0.93) | No |
| | VI-22 | 17.7 | 5 | 90–95 | | Yes |
| | VI-23 | 17.7 | 10 | 90–95 | I + II | partial |
| | VI-24 | 24.27 | 5 | 105–112 | I (0.94) | No |
| | VI-25 | 24.27 | 10 | 110–112 | I (0.93) | No |
| | VI-26 | 15.5 | 5 | 100–105 | Amorphous | Yes |
| | VI-27 | 15.5 | 10 | 100–105 | Amorphous | Yes |
| | VI-28 | 5.53 | 22.6 | 110–120 | II | Yes |
| | VI-29 | 3.36 | 23.3 | 110–120 | N.D. | No |
| N-methylhomopiperidine Oxide | VI-30 | 17.8 | 10 | 65–70 | N.D. | Yes |
| | | (80:20 A.O.:DMF) | | | | |
| | VI-31 | 23.09 | 5 | 105–110 | I (0.94) | No |
| | VI-32 | 23.09 | 10 | 105–110 | I (0.94) | No |
| N-methylhomopiperidine Oxide | VI-33 | 11.28 | 5 | 105–110 | II | Yes |
| | VI-34 | 11.28 | 10 | 105–110 | II | Yes |
| | VI-35 | 20.0 | 5 | 85–100 | II | Yes |
| | VI-36 | 20.0 | 10 | 85–100 | II | Yes |
| Dimethylethanolamine Oxide | VI-37 | 15 | 5 | 80–85 | I (0.94) | No |
| | VI-38 | 15 | 10 | 80–85 | I (0.93) | No |
| | VI-39 | 15 | 5 | 100–105 | I (0.91) | No |
| | VI-40 | 15 | 10 | 100–105 | I (0.93) | No |
| | VI-41 | 14.8 | 5 | 80–85 | I | No |
| | VI-42 | 14.8 | 10 | 80–85 | I | No |
| | VI-43 | 11.3 | 5 | 80–85 | II + Amorphous | Yes |
| | VI-44 | 11.3 | 10 | 80–85 | II + Amorphous | |
| | VI-45 | 10.2 | 5 | 80–85 | II | Yes |
| | VI-46 | 10.2 | 10 | 80–85 | II + Amorphous | Yes |
| | VI-47 | 6 | 15 | 95–120 | II | Yes |
| | VI-48 | 3.5 | 16.5 | 95–120 | — | Yes |
| Dimethylbenzylamine Oxide | VI-49 | 16.76 | 10 | 75–80 | Not determined | Yes |
| | | (75:25 A.O.:DMF) | | | | |
| | VI-50 | 32.2 | 10 | 80–90 | N.D. | No |
| | VI-51 | 16.83 | 5 | 105–110 | I (0.95) | No |
| | VI-52 | 16.83 | 10 | 105–110 | I (0.95) | No |
| | VI-53 | 13.04 | 5 | 105–110 | Amorphous | Yes |
| | VI-54 | 13.04 | 10 | 105–110 | Amorphous | Yes |
| | VI-55 | 5.5 | 15 | 115–120 | N.D. | Yes |
| | VI-56 | 1.8 | 16.1 | 115–120 | N.D. | No |

Although the invention is described in detail for the purpose of illustration, it is to be understood that such detail is solely for that purpose, and that variations can be made therein by those skilled in the art without departing from the spirit and scope of the invention except as it may be limited by the claims. While the amine oxides contemplated by the invention are referred to herein simply as "tertiary amine oxides," they are probably more accurately referred to as "tertiary amine N-oxides" and it is to be understood that tertiary amine N-oxides are intended.

What is claimed is:

1. In a process for precipitating cellulose from a solution thereof which comprises dissolving cellulose in a solvent for the cellulose containing a tertiary amine oxide and thereafter shaping the solution and separating the cellulose from the tertiary amine oxide, the improvement wherein the solution is prepared by a process which comprises dissolving from 10–35% by weight cellulose in a solvent for the cellulose which comprises a tertiary amine oxide and from about 1.4% to about 29% by weight of water.

2. The process of claim 1 wherein the solution additionally contains an aprotic organic liquid co-solvent for cellulose, compatible with the amine oxide having a dipole moment greater than about 3.5 Debyes.

3. The process of claim 1 wherein the solvent is selected from the group consisting of N-methylmorpholine oxide with from about 5.5% to about 18% water, dimethylethanolamine oxide with from about 1.4% to about 13% water, dimethylbenzylamine oxide with from about 5.5% to about 17% water, N-methylhomopiperidine oxide with from about 5.5% to about 20% water, triethylamine oxide with from about 7% to about 29% water, dimethylcyclohexylamine oxide with from about 5.5% to about 16% water and N-methylpiperidine and up to about 17.5% water.

4. The process of claim 1 wherein the solvent comprises N-methylmorpholine oxide and from about 5.5% to about 18% water.

5. The process of claim 1 wherein the solvent comprises dimethylethanolamine oxide and about 1.4% to about 13% water.

6. The process of claim 1 wherein the solvent comprises dimethylcyclohexylamine oxide and about 5.5% to about 16% water.

7. In a process which comprises dissolving cellulose in a tertiary amine oxide solvent for the cellulose and thereafter shaping the solution and separating the cellulose from the tertiary amine oxide, the improvement wherein the solution is prepared with a solvent for the cellulose comprising a tertiary amine oxide selected from the group consisting of:
   (a) triethylamine oxide and
   (b) tertiary amine oxides having one or two of the valence bonds of the N substituted by a methyl residue and, where one methyl residue is present, the remaining valences are satisfied by a divalent radical forming a 5- to 7-membered ring structure having the N-atom in the ring; where two methyl residues are present, the remaining valence is satisfied by (1) a monovalent cyclic 5-, 6- or 7-membered residue which may be substituted only by methyl residues at the β- or ε-positions, or (2) by a radical which can form a pseudo-cyclic structure through interaction with the N-oxide functionality, and from about 1.4% to about 29% by weight of water.

8. In a process which comprises dissolving cellulose in a tertiary amine oxide solvent for the cellulose and thereafter shaping the solution and separating the cellulose from the tertiary amine oxide, the improvement wherein the solution is prepared with a solvent for the cellulose comprising (1) a tertiary amine oxide having one of the following structures:

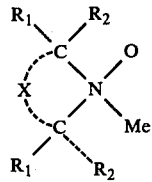 (a)

where

X is a radical chain completing a ring comprising 2 to 4 carbon atoms, $R_1$ and $R_2$ are H or methyl (Me);

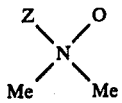 (b)

wherein Z is (i) a saturated or aromatic, unsaturated 5-, 6- or 7-membered ring which may be substituted only by methyl at the β- or ε-positions or (ii) $CH_2CH_2W$ where W can be OH, SH or $NH_2$, or (2) triethylamine oxide and from about 1.4% to about 29% by weight of water.

9. In a process which comprises dissolving cellulose in a tertiary amine N-oxide solvent for the cellulose, shaping the resulting solution and thereafter precipitating the cellulose from the solution while retaining its shape, the improved process which comprises dissolving cellulose in a solvent containing a tertiary amine N-oxide selected from the group consisting of triethylamine N-oxide and a tertiary amine N-oxide having a cyclic or pseudo-cyclic structure in which the ring has a width of 5.15 Å or less and from about 1.4% to 29% by weight water based on the weight of the resulting solution, said tertiary amine N-oxide having a dipole moment of at least about 4.5 Debyes, shaping the resulting solution and precipitating the cellulose from the solution while retaining the shape thereof by exposing the shaped solution to water.

10. The process of claim 9 wherein said resulting solution contains from 10% to 35% dissolved cellulose.

* * * * *